(12) United States Patent
Millman et al.

(10) Patent No.: US 7,917,831 B2
(45) Date of Patent: Mar. 29, 2011

(54) OPTIMIZATION OF STORAGE DEVICE ACCESSES IN RAID SYSTEMS

(75) Inventors: Steven D. Millman, Gilbert, AZ (US); Michael J. Torla, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 957 days.

(21) Appl. No.: 11/763,107

(22) Filed: Jun. 14, 2007

(65) Prior Publication Data

US 2008/0313397 A1    Dec. 18, 2008

(51) Int. Cl.
*G11C 29/00* (2006.01)
(52) U.S. Cl. ......... 714/763; 711/111; 711/112; 711/114
(58) Field of Classification Search .............. 714/763; 711/111–114
See application file for complete search history.

(56) References Cited

U.S. PATENT DOCUMENTS

| | | | |
|---|---|---|---|
| 4,092,732 A | | 5/1978 | Ouchi |
| 5,742,752 A | | 4/1998 | DeKoning |
| 5,946,707 A | | 8/1999 | Krakirian |
| 6,304,942 B1 | * | 10/2001 | DeKoning .............. 711/114 |
| 6,353,895 B1 | | 3/2002 | Stephenson |
| 6,370,611 B1 | | 4/2002 | Callison et al. |
| 6,665,773 B1 | | 12/2003 | McCombs |
| 6,772,287 B2 | * | 8/2004 | Uchiyama et al. ............ 711/114 |
| 6,918,007 B2 | | 7/2005 | Chang et al. |
| 6,961,815 B2 | | 11/2005 | Kistler et al. |
| 7,685,499 B2 | * | 3/2010 | Tsai et al. ..................... 714/770 |

OTHER PUBLICATIONS

Adaptec, "Which RAID Level is Right for Me?" P/N 666849-011, 2005, 5 pages.
Adaptec, "Hardware RAID vs. Software RAID: Which Implementation is Best for my Application?" 2006, 5 pages.
Patterson, et al., "A Case for Redundant Arrays of Inexpensive Disks (RAID)," 25 pages (date unknown).

* cited by examiner

*Primary Examiner* — Sam Rizk

(57) ABSTRACT

A result value, such as a parity value, for a set of corresponding data elements from a plurality of storage devices is determined using a commutative operation. When accessing the set of corresponding data elements from a plurality of storage devices, a dual access can be performed for the storage device accessed last for the set of corresponding data elements so as to also obtain a data element from the last-accessed storage device for the next parity calculation. As a result, the number of storage device accesses can be reduced compared to conventional systems whereby a single access is performed for each storage device to obtain a single data element from the storage device.

20 Claims, 6 Drawing Sheets

OPTIMIZATION OF STORAGE DEVICE ACCESSES IN RAID SYSTEMS

FIELD OF THE DISCLOSURE

The present disclosure relates generally to Redundant Array of Independent Disks (RAID)-based systems and more particularly to accessing storage devices for RAID-based parity operations.

BACKGROUND

Redundant Array of Independent Disks (RAID)-based systems utilize multiple storage devices to store data in a manner that allows recovery of data in the event that one of the storage devices is corrupted. Certain RAID-based implementations utilize a parity technique whereby a parity value is calculated by performing a logical operation (typically an XOR operation) on a data element from each of at least a subset of the storage devices. The parity value subsequently can be used to determine whether a corresponding storage location of one of the storage devices has been corrupted or has been accessed correctly from the storage device. If identified as corrupted or accessed incorrectly, the correct data element can be recovered using the parity value and the other corresponding data elements.

Conventional RAID-based systems calculate a parity value by accessing a single data element from each storage device in a fixed sequence, storing each data element in a first-in first-out (FIFO) buffer as it is accessed, and pulling each data element out of the FIFO buffer in turn and performing an XOR operation with the data element and the results of the previous XOR operation (with the previously-pulled data element if it is the first XOR operation to calculate a particular parity value). Thus, for N storage devices, a data element size of B bytes, and a read operation of R bytes, conventional RAID-based systems must perform at least N*B/R read operations to obtain N data elements to calculate a parity value. In many implementations, the storage devices are connected via a bus or bus interface common to all of the storage devices and the number and frequency of storage device accesses needed to calculate the parity value or to confirm that a data element has not been corrupted can overwhelm the bandwidth of the bus or bus interface, thereby reducing the efficiency of the processing system in which the RAID-based system is implemented. Accordingly, an improved technique for accessing data elements from storage devices in parity-based RAID-based systems would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
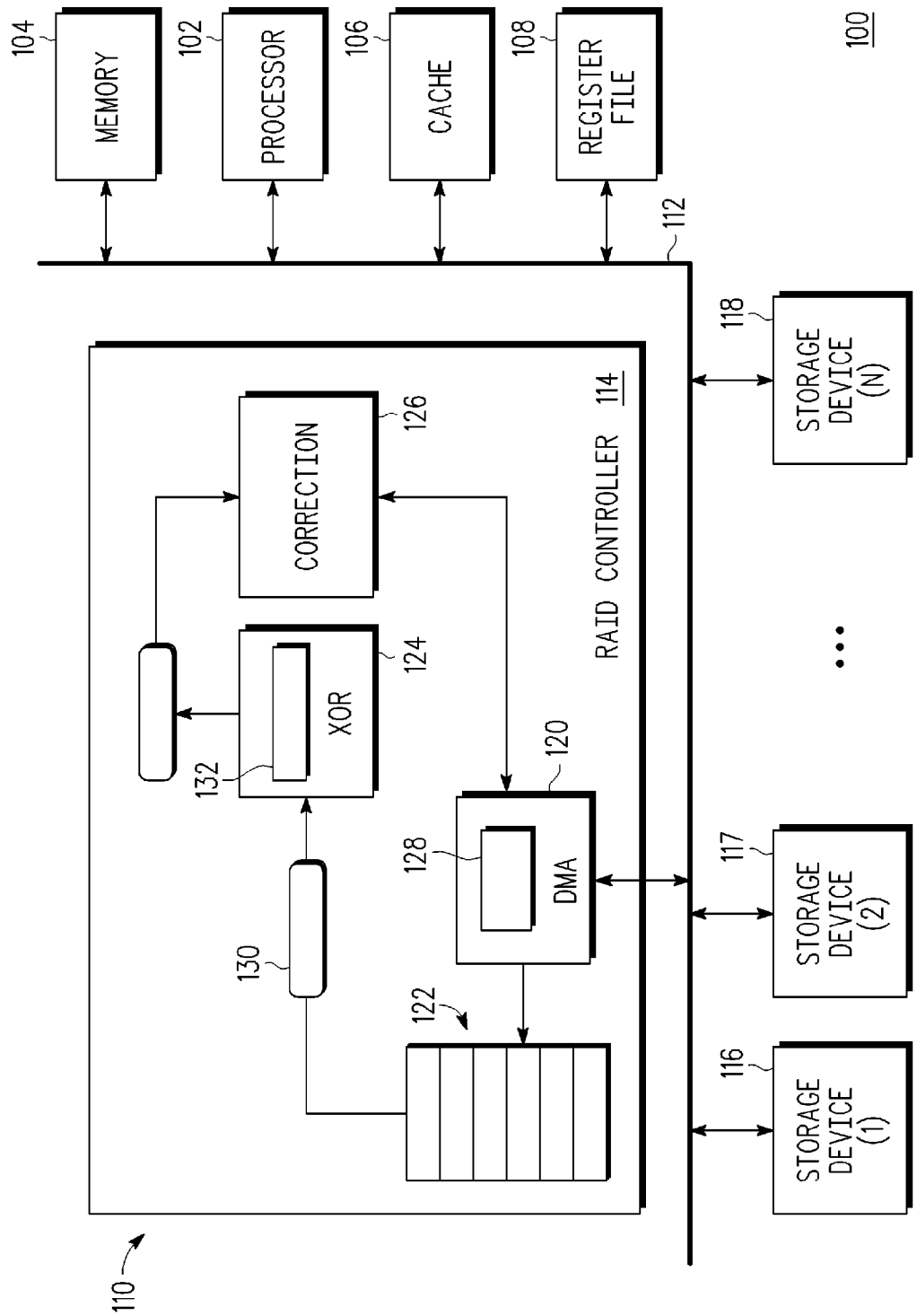
FIG. 1 is a block diagram illustrating a processing system utilizing a RAID-based system in accordance with at least one embodiment of the present disclosure.

In accordance with one aspect of the present disclosure, a method is provided for use in a data storage system including N storage devices. The method includes performing a single access to each storage device of a first sequence of storage devices to obtain a data element from each storage device of the first sequence, the first sequence advancing from a first storage device to an N−1th storage device, and the data elements from the storage devices of the first sequence forming a first subset of N−1 data elements. The method further includes performing a first dual access to an Nth storage device of the N storage devices to obtain a first data element and a second data element, the first subset of N−1 data elements and the first data element forming a first set of N data elements. The method additionally includes performing a first commutative operation using each data element of the first set of N data elements to generate a first result data and storing the first result data.

In accordance with another aspect of the present disclosure, a method includes performing a first access operation to a first storage device of a plurality of storage devices to obtain a first data element from the first storage device and storing the first data element at a first-in first-out (FIFO) buffer. The method further includes performing a second access operation to a second storage device of the plurality of storage devices to obtain a second data element and third data element from the second storage device, the second access operation performed subsequent to the first access operation and storing the second data element at the FIFO buffer subsequent the first data element. The method additionally includes storing the third data element at the FIFO buffer subsequent to the second data element. The method further includes performing a third access operation to the first storage device to obtain a fourth data element and a fifth data element from the storage device, the third access operation performed subsequent to the second access operation and storing the fourth data element at the FIFO buffer subsequent to the third data element. The method additionally includes storing the fifth data element at the FIFO buffer subsequent to the fourth data element. The method also includes obtaining the first data element and the second data element from the FIFO buffer and performing a first commutative operation using the first data element and second data element to generate a first result data. The method further includes storing the first result data and obtaining the third data element and the fourth data element from the FIFO buffer subsequent to obtaining the first data element and the second data element from the FIFO buffer. The method additionally includes performing a second commutative operation using the third data element and the fourth data element to generate a second result data and storing the second result data.

In accordance with yet another aspect of the present disclosure, a system includes a controller coupleable to a plurality of storage devices. The controller includes a first-in first-out (FIFO) buffer configured to buffer data elements and an access interface configured to initiate a first access operation to a first storage device of a plurality of storage devices to obtain a first data element from the first storage device for storage in the FIFO buffer and initiate a second access operation to a second storage device of the plurality of storage devices to obtain a second data element and a third data element from the second storage device for storage in the FIFO buffer subsequent to the first data element. The controller further includes a commutative operation component coupled to the FIFO buffer and configured to perform a first commutative operation using the first data element and the second data element obtained from the FIFO buffer to generate a first result data.

FIGS. 1-6 illustrate techniques for accessing data elements from a plurality of storage devices and determining result values for corresponding data elements. In at least one embodiment, a result value, such as a parity value, for a set of corresponding data elements is determined using a commutative operation. As the operation is commutative, the order in which the data elements are obtained and used in the operation has no effect on the final value of the result data. Accordingly, in at least one embodiment, when accessing the set of corresponding data elements from a plurality of storage devices, a dual access can be performed for the storage device accessed last for the set of corresponding data elements so as to also obtain a data element from the last-accessed storage device for the next parity calculation. As a result, the number of storage device accesses can be reduced compared to conventional systems whereby a single access is performed for each storage device to obtain a single data element from the storage device.

The term "single access" and its variants, as used herein, refer to the performance of one or more read operations to a storage device to obtain only a single data element from the storage device as a result of the access. The term "dual access" and its variants, as used herein, refer to the performance of one or more read operations to a storage device to obtain two data elements from the storage device as a result of the access. To illustrate, for a data element having a size of X bytes and a storage device capable of supporting a read operation size of X bytes, a single access would be a single read operation to the storage device to obtain X bytes, representing a single data element. In this instance, a dual access would be two read operations in sequence to the same storage device to obtain 2X bytes, representing two data elements. As another example, for a data element having a size of 2X bytes and a storage device capable of supporting a read operation of X bytes, a single access would be two read operations in sequence to the same storage device to obtain 2X bytes, representative of a single data element. In this instance, a dual access would be four read operations in sequence to the same storage device to obtain 4X bytes, representative of two data elements from the storage device. As yet another example, for a data element of X bytes and a storage device capable of supporting a read operation of up to 2X bytes, a single access would be a single read operation to the storage device to obtain X bytes, representative of a single data element. In this instance, a dual access would be a single read operation to the storage device to obtain 2X bytes, representative of two data elements.

For ease of discussion, the example techniques are described below in the context of XOR operations for determining parity values. However, alternate commutative operations can be implemented using the guidelines provided herein without departing from the scope of the present disclosure. Example alternate commutative operations can include weighted XOR operations, AND operations, OR operations. Likewise, the commutative operations can be used to determine types of result data other than parity values without departing from the scope of the present disclosure.

An example alternative commutative operation, or parity operation, that can be advantageously utilized in RAID-based applications, as well as other applications, includes a weighted XOR operation based on a galois field, or finite field. In a galois field, XOR is a weighted addition, where each source can be weighted equally. Alternately, each source (each byte in the source) can be "multiplied" by a corresponding weight prior to performing the XOR operation. This multiplication can be implemented as a modular multiplication computation. Any byte has a value from, for example, 0 to 255 (or 0x00 to 0xFF in hexadecimal). The multiplication function modulo another number results in a weighted byte having a unique value also from 0 to 255; that is, the multiplication results in a transformation of the data from value k to value j, where given modulus m, for each k there is exactly one corresponding j, and vice-versa. Typically, each weight is a power of 2: $2^0$; $2^1$; etc. Multiplying by the weight can be effectively performed by shifting each byte of a data element left by the power (so to multiply by $2^3$, the data element is shifted left three bits), and then for each bit asserted that is shifted outside the bounds of an 8-bit field, a 9-bit reduction value is added, shifted left such that most significant bit of the byte is aligned with the asserted bit. Because the operation is in the context of a galois field, all these reductions become XOR operations. To illustrate, assume that a byte 0x42 is to be multiplied by $2^3$ mod 0x11d. A method for computing this is to shift left ("→") and add three times: 0x42→0x84→0x108+11d=0x15→0x2a.

FIG. 1 illustrates an example processing system 100 utilizing a parity-based RAID-based system in accordance with at least one embodiment of the present disclosure. The processing system 100 includes one or more processors 102, peripheral storage components, such as a memory 104, a cache 106, and a register file 108, and a RAID-based system 110 connected via one or more busses 112 or other interconnects. The RAID-based system 110 includes a RAID controller 114 and a plurality of storage devices, including storage devices 116, 117, and 118 ("storage devices 116-118"), wherein the RAID controller 114 and the plurality of storage devices are connected via one or more buses or other interconnects (e.g., the bus 112), such as a small computer serial interconnect (SCSI)-based bus, a serial advanced technology attachment (SATA)-based bus, and the like. The storage devices 116-118 can include any of a variety of storage device types and combinations thereof, such as magnetic hard disks, optical disks, flash memory devices, and the like.

The RAID controller 114, in one embodiment, is configured to access data from the storage devices 116-118 on behalf of the processor 102 and the peripheral storage components, and to store data at the storage devices 116-118 on behalf of the processor 102 and the peripheral storage components. If an error is detected in data accessed from a particular storage device, the RAID controller 114 can correct the accessed data using a previously-calculated parity value associated with the accessed data. While storing data, the RAID controller 114 can calculate a parity value using the data to be stored at a storage device along with data from corresponding locations of the other storage devices. This calculated parity value then can be used to recover data from a corrupted storage location of one of the storage devices 116-118.

In the depicted example, the RAID controller 114 includes an access interface 120 (e.g., a bus interface or a direct memory access (DMA) controller), a first-in first-out (FIFO) buffer 122, a commutative operation component (illustrated as XOR component 124), and a correction component 126. The access interface 120 is configured to perform read operations to the storage devices 116-118 to access data from the storage devices 116-118 in particular sequences and place the accessed data in the FIFO buffer 122. The access interface 120 further can be configured to store data from the processor 102 or the peripheral storage components to one or more of the storage devices 116-118, as well as storing parity values calculated by the XOR component 124 to one or more of the storage devices 116-118 (or alternately to a storage device dedicated to storing parity values). The access interface 120 includes a sequencer 128 to control the sequence and type (i.e., single or double) of accesses to the storage devices 116-118. As described in greater detail herein, the sequencer 128 can be implemented as a hard-coded or programmable table or other data structure, as a state machine, as a executable routine, and the like.

The XOR component 124, in one embodiment, determines a result data (e.g., a parity value) for each set of corresponding data elements from the plurality of storage devices, wherein the set of corresponding data elements includes only one data element from each storage device. To calculate the result data for a set of corresponding data elements, the XOR component 124 obtains data elements (e.g., data element 130) from the FIFO buffer 122 in their stored sequence and performs an XOR operation for each data element as it is accessed. The first data element of the set is stored in a temporary register 132. For the second data element and subsequent data elements of the set, the obtained data element is XORed with the value present in the temporary register 132 and the temporary register 132 is overwritten with the results of the XOR operation. After the Nth data element has been obtained and XORed with the value present in the temporary register 132 (assuming there are N storage devices), the resulting value stored in the temporary register 132 is output as the parity value for the set of corresponding data elements.

The correction component 126, in one embodiment, is configured to verify the accessed data elements based on a parity value or other result data output by the XOR component 124 by comparing it with a second parity value that was previously calculated for the set of data elements. In the event that the two parity values do not match, the correction component 126 identifies the corrupted data element and corrects it using the previous parity value using any of a variety of parity-based correction techniques. In the event that the corrupted data element was corrupted at the storage device, the correction component 126 can overwrite the corrupted data element at the storage device. After verifying an accessed data element isn't corrupt, or after correcting a corrupted data element, the data element can be provided to the processor 102 or the peripheral storage components.

As discussed above, the XOR component 124 performs a series of XOR operations with a set of corresponding data elements from the plurality of storage devices. As the XOR operations are commutative, the order in which the data elements of each set are XORed does not affect the final parity value. Accordingly, rather than performing a single access for each of the storage devices in sequence to obtain a single data element from each storage device to build a set of corresponding data elements in the FIFO buffer 122, in one embodiment, the sequencer 128 controls the access interface 120 such that a dual access is performed to the storage device accessed at the beginning of the set, the end of the set, or for both the storage device at the beginning of the set and the storage device at the end of the set. Thus, by performing a dual access to obtain two data elements from the same storage device, one data element for the set being processed and one data element for the next set, the number of storage device accesses can be reduced compared to conventional techniques whereby a single access is performed for each storage device to obtain only a single data element. Example storage device access sequences are discussed below with reference to FIGS. 4-6.

Figure 2:
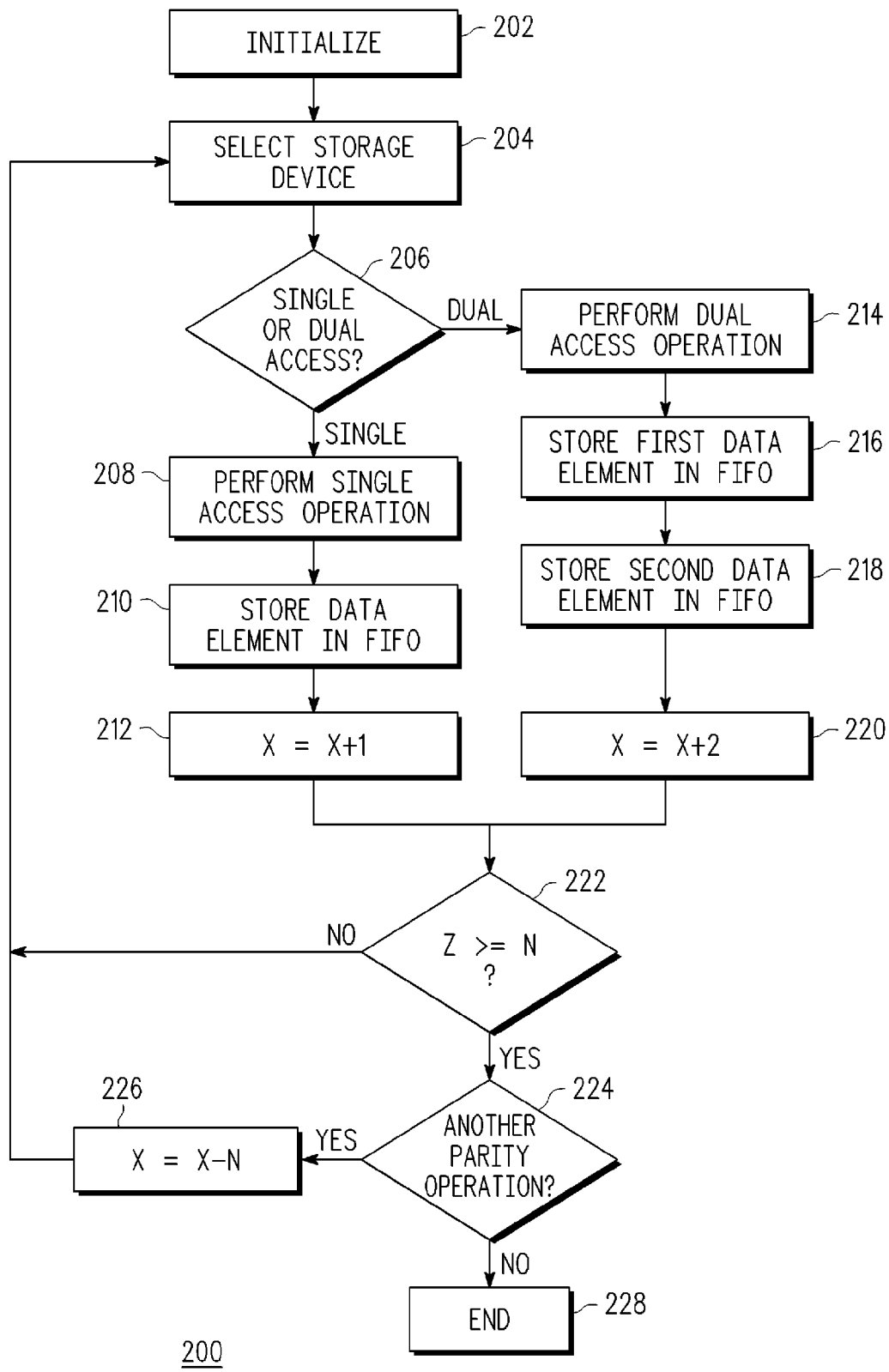
FIG. 2 is a flow diagram illustrating a method for accessing data elements from storage devices for parity operations in accordance with at least one embodiment of the present disclosure.

FIG. 2 illustrates an example method 200 for accessing a plurality of storage devices to obtain a set of corresponding data elements for the calculation of a parity value in accordance with at least one embodiment of the present disclosure. For ease of illustration, the method 200 is described in the context of the RAID controller 114 of FIG. 1, wherein the method 200 represents a process implemented by the sequencer 128 of the RAID controller 114.

At block 202, the access interface 120 receives a command to build a set of corresponding data elements in the FIFO buffer 122 from N storage devices. In response to this command, the sequencer 128 initializes and prepares to load a set of N data elements into the FIFO buffer 122. As part of this initialization, a variable X is set to an initial value (e.g., zero).

At block 204, the sequencer 128 selects a storage device of the N storage devices based on a predetermined storage device access sequence represented as a table or other data structure, a state machine, a software routine or algorithm, or the like. For each set of corresponding data elements, each storage device is accessed once and only once; however, for two sets processed in sequence, a dual access may be performed to a storage device to obtain two data elements, one data element for the end of one set and another data element for the start of the next set. Example access sequences are described in greater detail herein.

At block 204, the sequencer 128 determines whether a single access or a dual access is to be performed for the selected storage device. In at least one embodiment, the determination of whether to perform a single access or a dual access is based on the predetermined storage device access sequence. In the event the access is determined to be a single access, at block 208 the sequencer 128 directs the access interface 120 to initiate a single access to the selected storage device to obtain a single data element from the selected storage device. To perform a single access, the access interface 120 gains control of the bus 112 and provides an address or other identifier associated with the set to the selected storage device via the bus 112. The access interface 120 then accesses or receives data stored at the provided address/identifier of the selected storage device via the bus 112, wherein the data contains the single data element. In instances whereby the size of the data element is larger than the size of read operations supported by the storage device, the single access may include multiple read operations while the storage device is accessed. Thus, while multiple read operations may be performed during a single access depending on data element size, the overhead of certain access processes, such as the bus contention process, the initialization of the storage device, and the like, needs only to be performed once for the single access. After receiving the data element from the selected storage device, at block 210 the access interface 120 stores the received data element at the FIFO buffer 122. At block 212 the sequencer increments the variable X by one to reflect that a data element of the set has been obtained and stored in the FIFO buffer 122.

In the event that the access is determined to be a dual access at block 206, at block 214 the sequencer 128 directs the access interface 120 to initiate a dual access to the selected storage device to obtain two data elements from the selected storage device. To perform a dual access, the access interface 120 initiates access to the selected storage device and then performs one or more read operations to the selected storage device to obtain two data elements from the storage device, wherein the number of read operations depends on the size of the data elements and the size of the read operations supported by the selected storage device. The first data element is obtained by the access interface 120 using the address or other identifier associated with the set currently being prepared and the first data element therefore is used in the set of corresponding data elements. The second data element of the dual access is obtained using a different address or different identifier associated with the next set of corresponding data elements to be subsequently processed. Accordingly, at block 216 the access interface 120 stores the first data element obtained from the selected storage device in the FIFO buffer 122 and at block 218 the second data element is stored in the FIFO buffer 122 following the first data element. Thus, the overhead involved in the access process needs only to be performed once while obtaining two data elements from the selected storage device. At block 220 the sequencer increments X by two to reflect that two data elements have been obtained and stored in the FIFO buffer 122.

At block 222, the sequencer 128 determines whether a data element has been obtained from each storage device of the N storage devices by comparing the variable X to N. In the event that X is less than N (meaning at least one storage element has not been accessed to obtain a data element for the set being processed), the method 200 returns to block 204, wherein the next storage device of the N storage devices is selected based on the predetermined storage device access sequence and the process represented by blocks 206, 208, 210, 212, 214, 216, 218, 220, and 222 is repeated for the next storage device.

In the event that X is equal to or greater than N, the set being processed includes a data element from each of the N storage devices and thus the sequencer 128 signals to the XOR component 124 that the set of corresponding data elements are ready for processing. At block 224 the sequencer 128 determines whether another parity operation is to be performed for another set of corresponding data elements. If so, the sequencer 128 reduces the variable X by N (thereby reflecting whether a data element has already been accessed and stored in the FIFO buffer 122 for the next set due to a dual access) at block 226 and the process of blocks 204, 206, 208, 210, 212, 214, 216, 218, 220, 222, 224, and 226 can repeat for the next parity operation. In the event that there is not another parity operation, at block 228 the method 200 ends.

Figure 3:
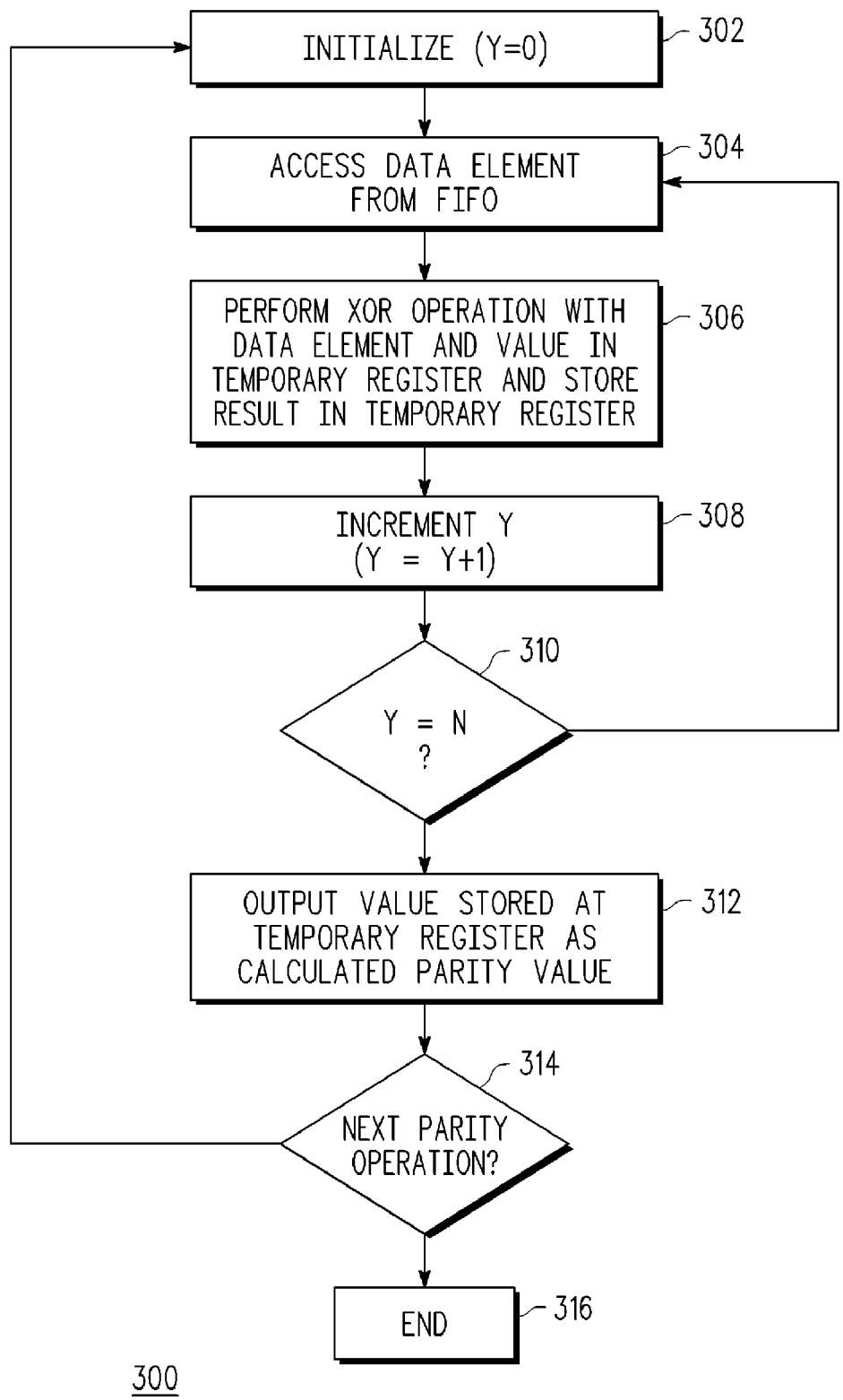
FIG. 3 is a flow diagram illustrating a method for determining a parity value based on data elements accessed from storage devices in accordance with at least one embodiment of the present disclosure.

FIG. 3 illustrates an example method 300 for determining a parity value for a set of N corresponding data elements from N storage devices in accordance with at least one embodiment of the present disclosure. For ease of discussion, the method 300 is described in the context of the RAID controller 114 of FIG. 1, wherein the method 300 represents a process implemented by the XOR component 124.

At block 302, the XOR component 124 initializes for a parity operation by clearing its temporary register 132 and by setting a variable Y to an initial value (e.g., zero). Further, in one embodiment, an initial value is stored in the temporary register 132, wherein the initial value has the identity property for the commutative operation to be performed; that is, the result of a commutative operation between the initial value and a second value is the second value. For XOR operations, the value zero (0) has the identity property and thus for implementations using an XOR operation as the commutative operation, a value of zero (0) can be stored to the temporary register 132 as the initial value.

At block 304, the XOR component 124 accesses the first data element from the FIFO buffer 122. At block 306 the XOR component 124 performs an XOR operation or other commutative operation with the accessed data element and the value stored in the temporary register 132 and the value stored in the temporary register is overwritten by the resulting value. For the initial XOR operation, the XOR component 124 performs an XOR operation or other commutative operation with the accessed data element and the initial value having the identity property, which has the result of the value of the accessed data element. Rather than initializing the temporary register 132 to an initial value having the identity property, the first data element of a set can be stored to the temporary register 132 at block 306 without performing an XOR operation or other commutative operation, thereby effectively initializing the temporary registers 132 to the first data element accessed for the set.

At block 308, the XOR component increments the variable Y to reflect that a data element of the set has been accessed from the FIFO buffer 122 and processed. At block 310, the XOR component 124 determines whether all of the data elements of the set have been accessed from the FIFO buffer 122 and utilized in determining the resulting parity value by comparing the value of the variable Y with the number N of storage devices. In the event that not all data elements have been accessed and utilized (i.e., Y<N), the method 300 returns to block 304 for the next data element of the set. Otherwise, if all data elements of the set have been accessed and utilized, the XOR component 124 outputs the final value of the temporary register 132 as the parity value calculated for the set of corresponding data elements at block 312. The parity value then can be used to verify whether data has been corrupted by comparing it with a previously calculated parity value for the set of corresponding data elements, the parity value can be stored at a storage device for subsequent verification purposes, and the like.

At block 314, the XOR component 124 determines whether another parity operation is to be performed for another set of corresponding data elements in the FIFO buffer 122. If so, the method 300 returns to block 302 for processing the next set of corresponding data elements. If not, the method 300 terminates at block 316.

Figure 4:
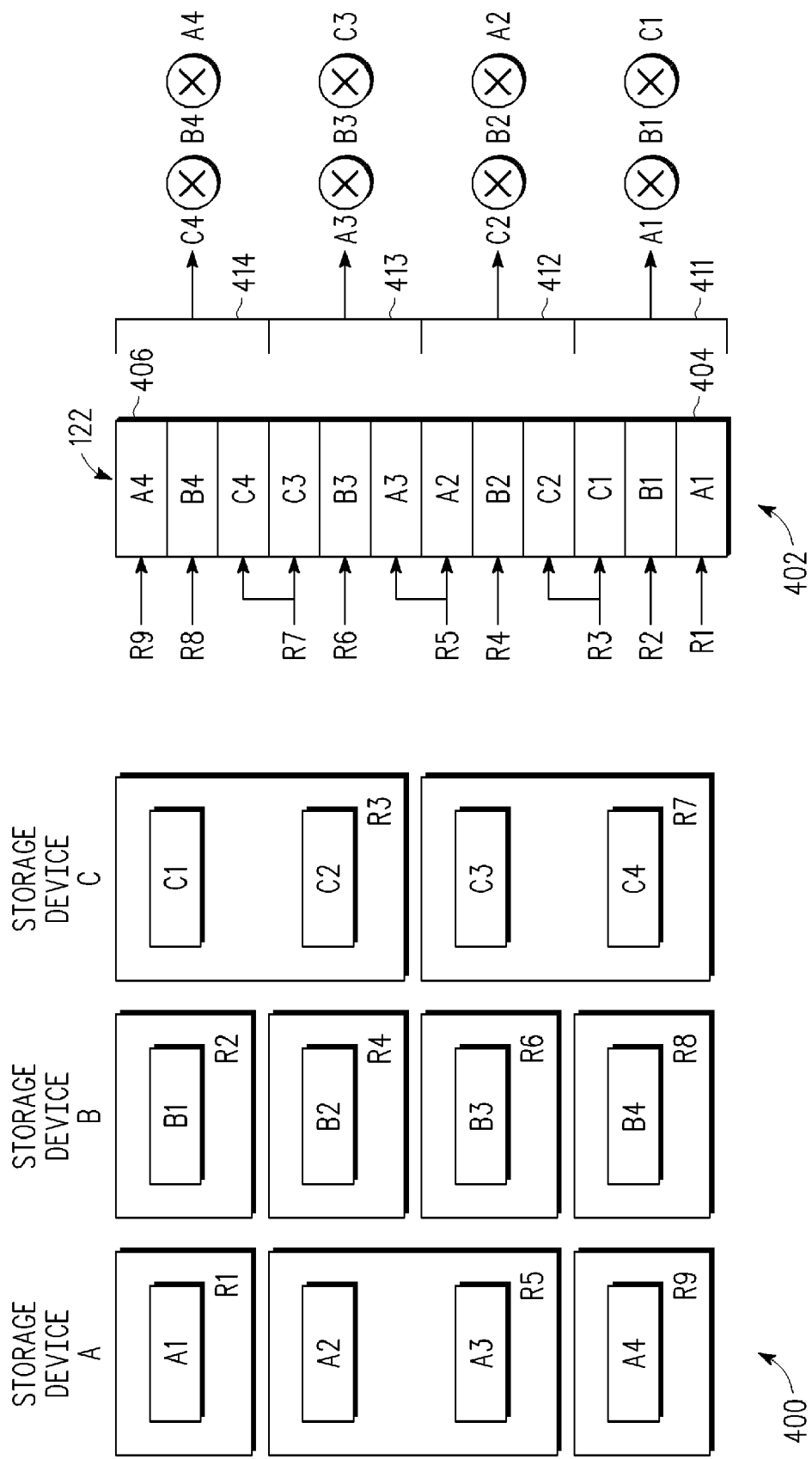
FIG. 4 is a diagram illustrating an example storage device access sequence and resulting parity determination in accordance with at least one embodiment of the present disclosure.
Figure 5:
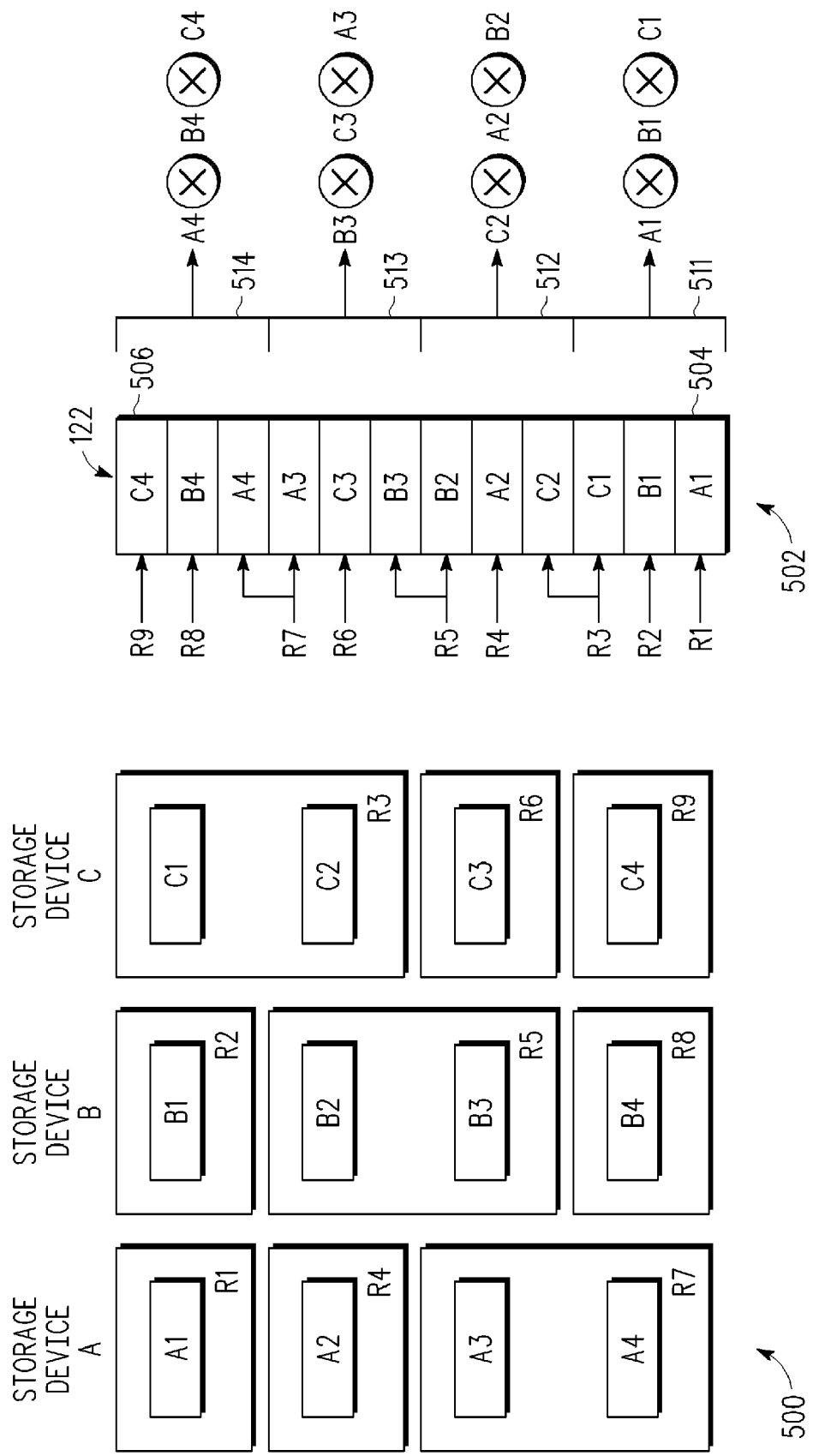
FIG. 5 is a diagram illustrating another example storage device access sequence and resulting parity determination in accordance with at least one embodiment of the present disclosure.
Figure 6:
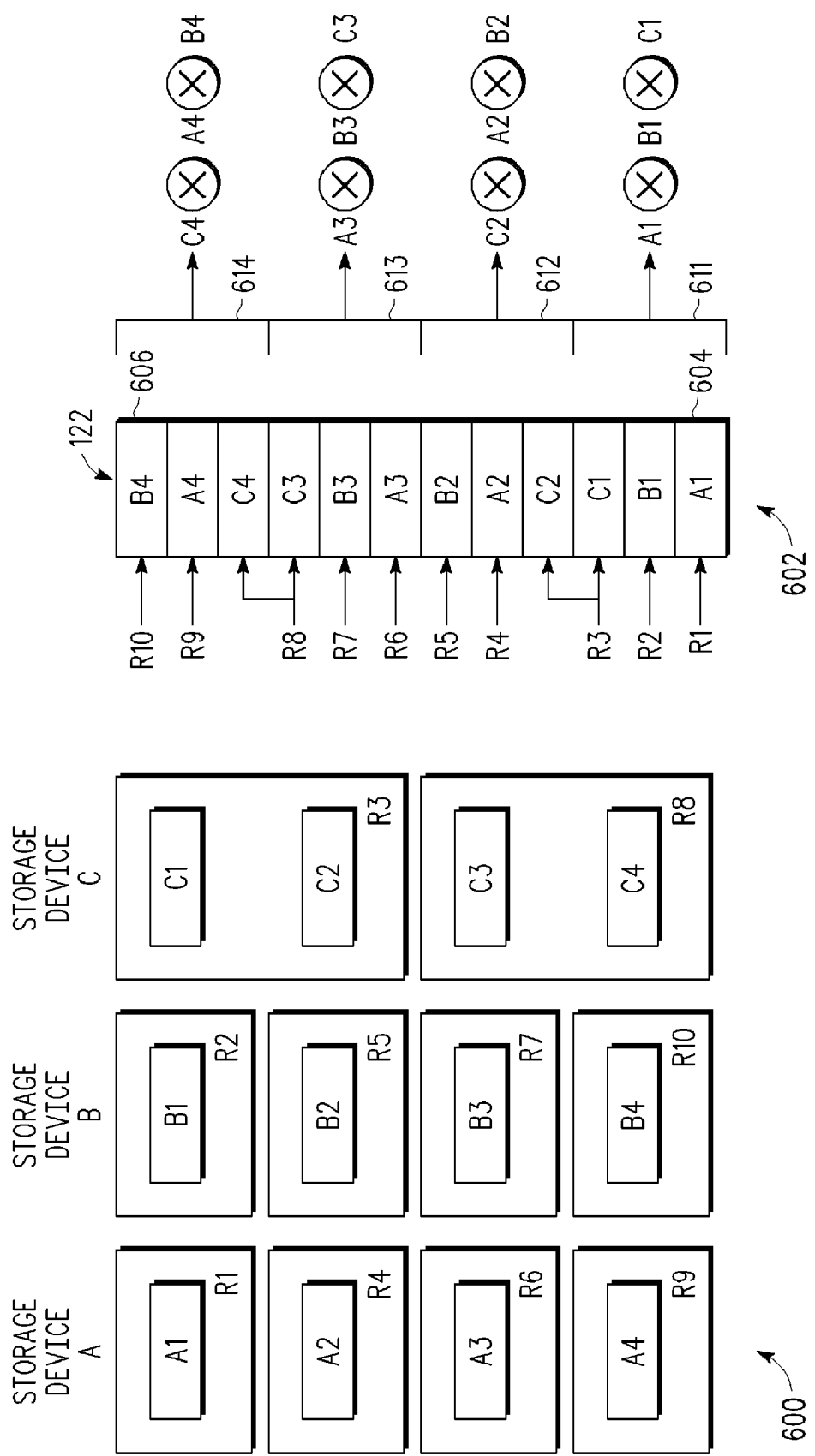
FIG. 6 is a diagram illustrating an example storage device access sequence and resulting parity values in accordance with at least one embodiment of the present disclosure.

FIGS. 4-6 illustrate example storage device access sequences to generate sets of corresponding data elements in a FIFO buffer for parity calculations in accordance with at least one embodiment of the present disclosure. For ease of discussion, the example storage device access sequences are described in the context of the RAID-based system 100 of FIG. 1 and utilizing three storage devices (N=3). These example storage device access sequences can be applied to RAID-based systems utilizing fewer or more storage devices without departing from the scope of the present disclosure. Although FIGS. 4-6 illustrate particular storage device access sequences, other storage device access sequences utilizing dual accesses to take advantage of the commutative nature of the parity operations can be implemented without departing from the scope of the present disclosure.

FIG. 4 illustrates an example storage device access sequence whereby sets of N corresponding data elements are accessed from N storage devices. As a general description of the storage device access sequence of FIG. 4, accesses are performed in a zigzag sequence from a first storage device to an Nth storage device and then back to the first storage device, and so forth, whereby the access at each end of the sequence (i.e., at the first storage device and at the Nth storage device) is a dual access except for the first access to storage device 1 and the last access to storage device N. The accesses to the second storage device through the N−1th storage device are single accesses.

To illustrate, diagram 400 of FIG. 4 illustrates a zigzag storage device access sequence from three storage devices (storage devices A, B, and C) to generate sets of three corresponding data elements, and whereby two XOR operations are performed using the three data elements of a set to determine a parity value for the set of data elements. Diagram 402 illustrates the resulting storage of data elements in the FIFO buffer 122, wherein the buffer location 404 and the buffer location 406 represent the first entry and last entry, respectively, of the FIFO buffer 122.

As depicted by diagram 400, the storage device access sequence initiates with a single access R1 to the storage device A to obtain the data element A1, followed by a single access R2 to the storage device B to obtain the data element B1, and followed by a dual access R3 to the storage device C to obtain the data element C1 and the data element C2. The storage device access sequence then returns to storage device B with a single access R4 to obtain the data element B2, followed by a dual access R5 to the storage device A to obtain the data element A2 and the data element A3. A single access R6 to the storage device B then is performed to obtain the data element B3, followed by a dual access R7 to the storage device C to obtain the data element C3 and the data element C4. The storage device access sequence then returns to the storage device B with a single access R8 to obtain the data element B4, followed by a single access R9 to the storage device A to obtain the data element A4.

As illustrated by diagram 402, the resulting sequence of data elements in the FIFO buffer 122 is A1, B1, C1, C2, B2, A2, A3, B3, C3, C4, B4, A4. Accordingly, the first set 411 of data elements has one, and only one, data element from each of the storage devices A, B, and C (data elements A1, B1, and C1), the second set 412 of data elements has one, and only one, data element from each of the storage devices A, B, and C (data elements C2, B2, and A2), the third set 413 of data elements has one, and only one, data element from each of the storage devices A, B, and C (data elements A3, B3, and C3), and the fourth set 414 of data elements has one, and only one, data element from each of the storage devices A, B, and C (data elements C4, B4, and A4). Accordingly, the first parity operation performed by the XOR component 124 on the first set 411 has a result data based on the XOR operation A1 XOR B1 XOR C1; the second parity operation performed by the XOR component 124 on the second set 412 has a result data based on the XOR operation C2 XOR B2 XOR A2; the third parity operation performed by the XOR component 124 on the third set 413 has a result data based on the XOR operation A3 XOR B3 XOR C3; and the fourth parity operation performed by the XOR component 124 on the fourth set 414 has a result data based on the XOR operation C4 XOR B4 XOR A4.

FIG. 5 illustrates yet another example storage device access sequence whereby sets of N corresponding data elements are accessed from N storage devices. As a general description of the storage device access sequence of FIG. 5, accesses are performed in staggered sequence such that for every set, a dual access is performed for one, and only one, of the storage devices and such that the storage device selected for dual access rotates between the N storage devices.

To illustrate, diagram 500 of FIG. 5 illustrates a staggered storage device access sequence from three storage devices (storage devices A, B, and C) to generate sets of three corresponding data elements, and whereby two XOR operations are performed using the three data elements of a set to determine a parity value for the set of data elements. Diagram 502 illustrates the resulting storage of data elements in the FIFO buffer 122, wherein the buffer location 504 and the buffer location 506 represent the first entry and last entry, respectively, of the FIFO buffer 122.

As depicted by diagram 500, the storage device access sequence initiates with a single access R1 to the storage device A to obtain the data element A1, followed by a single access R2 to the storage device B to obtain the data element B1, and followed by a dual access R3 to the storage device C to obtain the data element C1 and the data element C2. The storage device access sequence then returns to storage device A with a single access R4 to obtain the data element A2, followed by a dual access R5 to the storage device B to obtain the data element B2 and data element B3. A single access R6 to the storage device C then is performed to obtain the data element C3, followed by a dual access R7 to the storage device A to obtain the data element A3 and the data element A4. The storage device access sequence then returns to the storage device B with a single access R8 to obtain the data element B4, followed by a single access R9 to the storage device C to obtain the data element C4.

As illustrated by diagram 502, the resulting sequence of data elements in the FIFO buffer 122 is A1, B1, C1, C2, A2, B2, B3, C3, A3, A4, B4, C4. Accordingly, the first set 511 of data elements has one, and only one, data element from each of the storage devices A, B, and C (data elements A1, B1, and C1), the second set 512 of data elements has one, and only one, data element from each of the storage devices A, B, and C (data elements C2, A2, and B2), the third set 513 of data elements has one, and only one, data element from each of the storage devices A, B, and C (data elements B3, C3, and A3), and the fourth set 514 of data elements has one, and only one, data element from each of the storage devices A, B, and C (data elements A4, B4, and C4). Accordingly, the first parity operation performed by the XOR component 124 on the first set 511 has a result data based on the XOR operation A1 XOR B1 XOR C1; the second parity operation performed by the XOR component 124 on the second set 512 has a result data based on the XOR operation C2 XOR A2 XOR B2; the third parity operation performed by the XOR component 124 on the third set 513 has a result data based on the XOR operation B3 XOR C3 XOR A3; and the fourth parity operation performed by the XOR component 124 on the fourth set 514 has a result data based on the XOR operation A4 XOR B4 XOR C4.

As shown by diagrams 400 and 500 of FIGS. 4 and 5, respectively, only nine storage device accesses are required in the example storage device access sequences to access the data elements for four parity calculations using three storage devices. In contrast, twelve storage device accesses would be required in conventional access techniques whereby only a single data element is obtained for any given storage device access. Thus, in the example contexts of FIGS. 4 and 5, the illustrated storage device access sequences reduces the number of storage device accesses by three accesses, or 25%, compared to conventional access techniques.

FIG. 6 illustrates another example storage device access sequence whereby sets of N corresponding data elements are accessed from N storage devices. As a general description of the storage device access sequence of FIG. 6, accesses are performed such that a dual access is performed for every pair of sets of corresponding data elements and whereby each dual access is performed to the same storage device.

To illustrate, diagram 600 of FIG. 5 illustrates an storage device access sequence from three storage devices (storage devices A, B, and C) to generate sets of three corresponding data elements, and whereby two XOR operations are performed using the three data elements of a set to determine a parity value for the set of data elements. Diagram 602 illustrates the resulting storage of data elements in the FIFO buffer 122, wherein the buffer location 604 and the buffer location 606 represent the first entry and last entry, respectively, of the FIFO buffer 122.

For the illustrated storage device access sequence, it is assumed that the storage device C is selected for each dual access. Accordingly, the storage device access sequence initiates with a single access R1 to the storage device A to obtain the data element A1, followed by a single access R2 to the storage device B to obtain the data element B1, and followed by a dual access R3 to the storage device C to obtain the data element C1 and the data element C2. The storage device access sequence then returns to storage device A with a single access R4 to obtain the data element A2, followed by a single access R5 to the storage device B to obtain the data element B2. A single access R6 to the storage device A then is performed to obtain the data element A3, followed by a single access R7 to the storage device B to obtain the data element B3. A dual access R8 to the storage device C then is performed to obtain the data element C3 and the data element C4. The storage device access sequence then returns to the storage device A with a single access R9 to obtain the data element A4 and with a single access R10 to the storage device B to obtain the data element B4.

As illustrated by diagram 602, the resulting sequence of data elements in the FIFO buffer 122 is A1, B1, C1, C2, A2, B2, A3, B3, C3, C4, A4, B4. Accordingly, the first set 611 of data elements has one, and only one, data element from each of the storage devices A, B, and C (data elements A1, B1, and C1), the second set 612 of data elements has one, and only one, data element from each of the storage devices A, B, and C (data elements C2, A2, and B2), the third set 513 of data elements has one, and only one, data element from each of the storage devices A, B, and C (data elements A3, B3, and C3), and the fourth set 414 of data elements has one, and only one, data element from each of the storage devices A, B, and C (data elements C4, A4, and B4). Accordingly, the first parity operation performed by the XOR component 124 on the first set 611 has a result data based on the XOR operation A1 XOR B1 XOR C1; the second parity operation performed by the XOR component 124 on the second set 612 has a result data based on the XOR operation C2 XOR A2 XOR B2; the third parity operation performed by the XOR component 124 on the third set 513 has a result data based on the XOR operation A3 XOR B3 XOR C3; and the fourth parity operation performed by the XOR component 124 on the fourth set 514 has a result data based on the XOR operation C4 XOR A4 XOR B4.

As shown by diagrams 600, only ten storage device accesses are required in the illustrated storage device access sequence to access the data elements for four parity calculations for three storage devices, whereas, as described above, twelve storage device accesses would be required in conventional access techniques. Thus, in the example context of FIG. 6 the illustrated storage device access sequences reduce the number of storage device accesses by two accesses, or 17%, compared to conventional access techniques.

The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a data storage system comprising N storage devices, a method comprising:
    performing a single access to each storage device of a first sequence of storage devices to obtain a data element from each storage device of the first sequence, the first sequence advancing from a first storage device to an N−1th storage device, and the data elements from the storage devices of the first sequence forming a first subset of N−1 data elements;
    performing a first dual access to an Nth storage device of the N storage devices to obtain a first data element and a second data element, the first subset of N−1 data elements and the first data element forming a first set of N data elements;
    performing a first commutative operation using each data element of the first set of N data elements to generate a first result data; and
    storing the first result data.

2. The method of claim 1, further comprising:
    performing a single access to each storage device of a second sequence of storage devices to obtain a data element from each storage device of the second sequence, the second sequence advancing from the N−1th storage device to a second storage device, and the data elements from the storage devices of the second sequence forming a second subset of N−2 data elements;
    performing a second dual access to the first storage device to obtain a third data element and a fourth data element, the second data element, the third data element, and the second subset of N−2 data elements forming a second set of N data elements;
    performing a second commutative operation using each data element of the second set of N data elements to generate a second result data; and
    storing the second result data.

3. The method of claim 2, further comprising:
    correcting an erroneous data element of the first set of N data elements using the first result data.

4. The method of claim 2, wherein:
    the first commutative operation comprises an XOR operation; and
    the second commutative operation comprises an XOR operation.

5. The method of claim 1, further comprising:
    performing a single access to each storage device of a second sequence of storage devices to obtain a data element from each storage device of the second sequence, the second sequence advancing from the N−1th storage device to the first storage device, and the data elements from the storage devices of the second sequence forming a second subset of N−1 data elements;

performing a second commutative operation using each data element of the second set of N data elements to generate a second result data; and
storing the second result data.

6. The method of claim 5, further comprising:
correcting an erroneous data element of the first set of N data elements using the first result data.

7. The method of claim 5, wherein:
the first commutative operation comprises an XOR operation; and
the second commutative operation comprises an XOR operation.

8. The method of claim 1, wherein storing the first result data comprises storing the first result data at a register.

9. The method of claim 1, wherein storing the first result data comprises storing the first result data as a parity data at a storage location of one of the plurality of storage devices, the parity data corresponding to the first data element and the second data element.

10. The method of claim 1, further comprising:
correcting an erroneous data element of the first set of N data elements using the first result data.

11. The method of claim 1, wherein the first commutative operation comprises an XOR operation.

12. A method comprising:
performing a first access operation to a first storage device of a plurality of storage devices to obtain a first data element from the first storage device;
storing the first data element at a first-in first-out (FIFO) buffer;
performing a second access operation to a second storage device of the plurality of storage devices to obtain a second data element and third data element from the second storage device, the second access operation performed subsequent to the first access operation;
storing the second data element at the FIFO buffer subsequent the first data element;
storing the third data element at the FIFO buffer subsequent to the second data element;
performing a third access operation to the first storage device to obtain a fourth data element and a fifth data element from the storage device, the third access operation performed subsequent to the second access operation;
storing the fourth data element at the FIFO buffer subsequent to the third data element;
storing the fifth data element at the FIFO buffer subsequent to the fourth data element;
obtaining the first data element and the second data element from the FIFO buffer;
performing a first commutative operation using the first data element and second data element to generate a first result data;
storing the first result data;
obtaining the third data element and the fourth data element from the FIFO buffer subsequent to obtaining the first data element and the second data element from the FIFO buffer;
performing a second commutative operation using the third data element and the fourth data element to generate a second result data; and
storing the second result data.

13. The method of claim 12, further comprising:
performing a fourth access operation to the second storage device to obtain a sixth data element from the third storage device;
storing the sixth data element in the FIFO buffer subsequent to the fifth data element;
obtaining the fifth data element and the sixth data element from the FIFO buffer subsequent to obtaining the third data element and the fourth data element from the FIFO buffer;
performing a third commutative operation using the fifth data element and the sixth data element to generate a third result data; and
storing the third result data.

14. The method of claim 12, further comprising:
performing a fourth access operation to a third storage device of the plurality of storage devices to obtain a sixth data element from the third storage device;
storing the sixth data element in the FIFO buffer subsequent to the first data element and prior to the second data element;
performing a fifth access operation to the third storage device to obtain a seventh data element from the third storage device;
storing the seventh data element in the FIFO buffer subsequent to the third data element and prior to the fourth data element;
obtaining the sixth data element from the FIFO buffer subsequent to the first data element and prior to the second data element;
obtaining the seventh data element from the FIFO buffer subsequent to the third data element and prior to the fourth data element;
wherein performing the first commutative operation comprises performing the first commutative operation using the first data element, the second data element, and the sixth data element to generate the first result data; and
wherein performing the second commutative operation comprises performing the second commutative operation using the third data element, the fourth data element, and the seventh data element to generate the second result data.

15. The method of claim 14, further comprising:
performing a sixth access operation to the third storage device to obtain an eighth data element from the third storage device;
storing the eighth data element in the FIFO buffer subsequent to the fifth data element;
performing a seventh access operation to the second storage device to obtain a ninth data element and a tenth data element from the second storage device;
storing the ninth data element in the FIFO buffer subsequent to the eighth data element;
storing the tenth data element in the FIFO buffer subsequent to the ninth data element;
obtaining the eighth data element and the ninth data element from the FIFO buffer subsequent to the fifth data element;
performing a third commutative operation using the fifth data element, the eighth data element, and the ninth data element to generate a third result data; and
storing the third result data.

16. A system comprising:
a controller coupleable to a plurality of storage devices, the controller comprising:
a first-in first-out (FIFO) buffer configured to buffer data elements;
an access interface configured to initiate a first access operation to a first storage device of a plurality of storage devices to obtain a first data element from the first storage device for storage in the FIFO buffer and initiate a second access operation to a second storage device of the plurality of storage devices to obtain a second data element and a third data element from the second storage device for storage in the FIFO buffer subsequent to the first data element; and a commutative operation component coupled to the FIFO buffer and configured to perform a first commutative operation using the first data element and the second data element obtained from the FIFO buffer to generate a first result data.

17. The system of claim 16, wherein:

the access interface is configured to initiate a third access operation to the first storage device to obtain a fourth data element from the first storage device for storage in the FIFO buffer subsequent to the third data element; and the commutative operation component is configured to perform a second commutative operation using the third data element and the fourth data element obtained from the FIFO buffer to generate a second result data.

18. The system of claim 16, further comprising:

the plurality of storage devices.

19. The system of claim 18, wherein each of the plurality of storage devices comprises a storage device selected from a group consisting of: a magnetic disk device; an optical disk device; a dynamic random access memory device; a static random access memory device; and a flash memory device.

20. The system of claim 16, further comprising:

a correction component to correct an erroneous data element of a storage device of the plurality of storage devices based on the first result data.

* * * * *